(12) United States Patent
Westerman et al.

(10) Patent No.: US 8,502,785 B2
(45) Date of Patent: Aug. 6, 2013

(54) GENERATING GESTURES TAILORED TO A HAND RESTING ON A SURFACE

(75) Inventors: Wayne Carl Westerman, San Francisco, CA (US); Rico Zorkendorfer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 832 days.

(21) Appl. No.: 12/269,843

(22) Filed: Nov. 12, 2008

(65) Prior Publication Data

US 2010/0117963 A1    May 13, 2010

(51) Int. Cl.
*G06F 3/033* (2006.01)
*G06F 3/041* (2006.01)

(52) U.S. Cl.
USPC .......................................... 345/173; 345/163

(58) Field of Classification Search
USPC ........................... 345/163, 173, 153, 156, 165
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,168,047 B1 * | 1/2007 | Huppi | 715/784 |
| 7,184,064 B2 | 2/2007 | Zimmerman et al. | |
| 7,227,526 B2 * | 6/2007 | Hildreth et al. | 345/156 |
| 7,256,770 B2 | 8/2007 | Hinckley et al. | |
| 7,663,607 B2 | 2/2010 | Hotelling et al. | |
| 2006/0012580 A1 * | 1/2006 | Perski et al. | 345/173 |
| 2006/0026521 A1 * | 2/2006 | Hotelling et al. | 715/702 |
| 2006/0097991 A1 | 5/2006 | Hotelling et al. | |
| 2006/0125803 A1 | 6/2006 | Westerman et al. | |
| 2006/0197753 A1 | 9/2006 | Hotelling | |
| 2007/0257891 A1 | 11/2007 | Esenther et al. | |
| 2007/0262965 A1 | 11/2007 | Hirai et al. | |
| 2008/0266257 A1 | 10/2008 | Chiang | |
| 2009/0174676 A1 | 7/2009 | Westerman | |

FOREIGN PATENT DOCUMENTS

| | | |
|---|---|---|
| JP | 2000-163031 A | 6/2000 |
| JP | 2002-323945 A | 11/2002 |

(Continued)

OTHER PUBLICATIONS

International Search Report mailed Mar. 23, 2010, for PCT Application No. PCT/US2009/064274, filed Nov. 12, 2009, two pages.

(Continued)

*Primary Examiner* — Joseph Feild
*Assistant Examiner* — Andrew Sasinowski
(74) *Attorney, Agent, or Firm* — Morrison & Foerster LLP

(57) ABSTRACT

The generation of gestures tailored to a hand resting on a mouse surface is disclosed. Gestures to be made on the mouse surface can be generated based on the natural pose of a hand resting on the mouse surface so that the gestures are comfortable. Fingers that are appropriately posed on the mouse surface to make a gesture can be identified for that gesture. Alternatively, gestures to be made on the mouse surface can be generated based on a user's preference. The user can identify the fingers that the user wishes to use to make a gesture.

30 Claims, 10 Drawing Sheets

FOREIGN PATENT DOCUMENTS

| | | |
|---|---|---|
| JP | 2002-342033 A | 11/2002 |
| JP | 2007-184008 A | 7/2007 |
| WO | WO-99/38149 A1 | 7/1999 |
| WO | WO-2006/027924 A1 | 3/2006 |
| WO | WO-2006/132817 A2 | 12/2006 |
| WO | WO-2006/132817 A3 | 12/2006 |
| WO | WO-2007/061057 A1 | 5/2007 |
| WO | WO-2010/056917 A1 | 5/2010 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, Wayne, Hand Tracking, Finger Identification, and Chordic Manipulation on a Multi-Touch Surface, Spring, 1999.

FingerWorks, iGesture Pac, http://www.fingerworks.com/igesture. html, Aug. 27, 2004 (2 pages).

U.S. Appl. No. 12/238,342, Motion Component Dominance Factors for Motion Locking of Touch Sensor Data, filed Sep. 25, 2008.

\* cited by examiner

US 8,502,785 B2

GENERATING GESTURES TAILORED TO A HAND RESTING ON A SURFACE

FIELD OF THE INVENTION

This relates to a touch sensitive mouse used as an input device for a computing system and, more particularly, to methods for generating gestures tailored to a hand resting on the mouse surface.

BACKGROUND OF THE INVENTION

Most computing systems can receive input from a user via an input device such as a mouse. The mouse can allow the user to move an input pointer, e.g., a cursor, in a user interface (UI) on a display screen of the computing system and to make a lection in the UI with the pointer, thereby triggering various operations in the computing system. The mouse can include a mechanism for data selection in the UI, which can be translated into signals that the computing system can use to select display elements in the UI corresponding to various operations in the computing system. For example, a touch sensitive mouse can include a touch device to make a selection. The touch device can detect a gesture made by the user on the mouse touch surface, the gesture corresponding to one or more operations in the computing system. The computing system can interpret the gesture and thereafter execute the corresponding operations.

Generally, particular gestures are predefined for particular operations in the computing system. Every user of the computing system must make the predefined gesture in order to execute the corresponding operation. However, in some cases, the predefined gesture may be awkward or uncomfortable for the user for a variety of reasons, e.g., the user's hand may have certain physical limitations or may have a different natural pose.

SUMMARY OF THE INVENTION

This relates to generating gestures tailored to a hand resting on a surface of a touch sensitive mouse. In some embodiments, a first gesture can be generated that is tailored to the natural pose of the hand resting on the mouse surface. Additional gestures can be generated that use either a subset of the fingers used for the first gesture and/or other fingers. In some embodiments, a first gesture can be generated based on a user's input of the user's preferences. Additional gestures can be generated based on the user's input of the user's preferences or as either a subset of the fingers used for the first gesture and/or other fingers.

DETAILED DESCRIPTION OF THE PREFERRED EMBODIMENTS

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to generating gestures tailored to a hand resting on a mouse surface. The gestures can be based on the natural pose of a hand resting on the mouse. This allows the user to make gestures that are comfortable to the user on the mouse surface.

Although some embodiments of this invention may be described herein in terms of gesturing on a touch sensitive mouse, it should be understood that embodiments of this invention are not so limited, but are generally applicable to any input device utilizing touch and other types of sensing technologies.

Figure 1A:
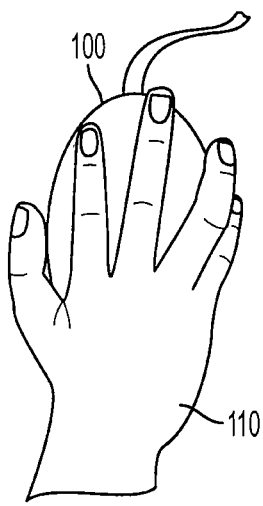
FIGS. 1a through 1c illustrate an exemplary natural pose of a hand resting on a mouse.
Figure 1B:
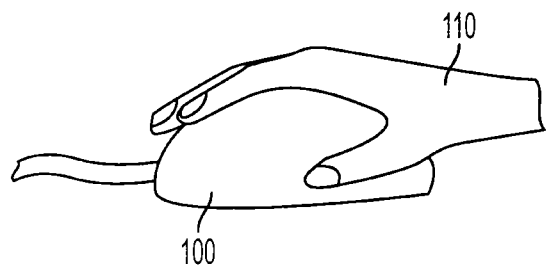
Figure 1C:
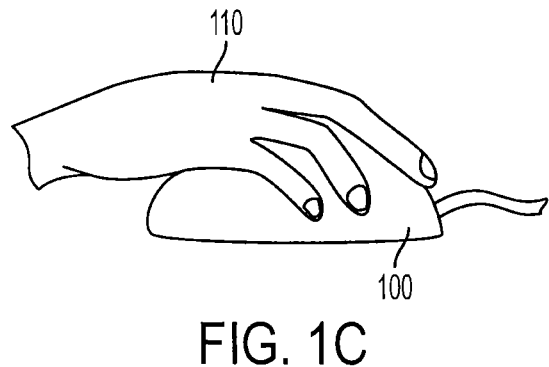

FIGS. 1a through 1c illustrate an exemplary natural pose of a hand resting on a mouse. FIG. 1a illustrates an exemplary top view of right hand 110 resting on a surface of mouse 100. FIG. 1b illustrates an exemplary left side view of right hand 110 resting on a surface of mouse 100. FIG. 1c illustrates an exemplary right side view of right hand 10 resting on a surface of mouse 100. Typically, a user can rest a hand on the mouse in the relaxed pose, illustrated in FIGS. 1a through 1c, for long periods of time even when the mouse is not being utilized. In this example, the index and middle fingers can rest on the top surface of the mouse, the thumb can rest on the left side surface of the mouse, and the ring and pinkie fingers can rest on the right side surface of the mouse. On a touch sensitive mouse, the resting hand can be detected as a touch event and processed by a computing system. Subsequently, the resting hand's touch can be processed by the computing system at such time as one or more fingers of the resting hand move in what can appear to be a gesture.

It is to be understood that the natural pose of a hand resting on a mouse surface is not limited to that shown herein, but may include various other poses where more or fewer fingers rest on the top and side surfaces, where the fingers rest higher or lower on the surfaces, and so on.

Figure 2A:
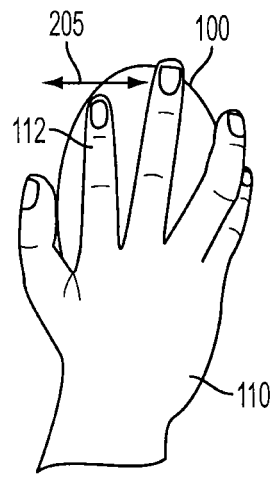
FIGS. 2a through 2k illustrate exemplary gestures that can be made by one or more fingers of a hand resting on a mouse.

FIGS. 2a through 2k illustrate exemplary gestures that can be made by one or more fingers of a hand resting on a mouse. In the example of FIG. 2a, index finger 112 of right hand 110 can make lateral motions 205 to make a gesture such as a "swipe" gesture while the hand rests on a surface of mouse 100. A swipe gesture can cause a computing device to perform an operation such as paging through UI displays on a display screen. The other fingers of the hand 110 can remain substantially stationary on the mouse surface.

Figure 2B:
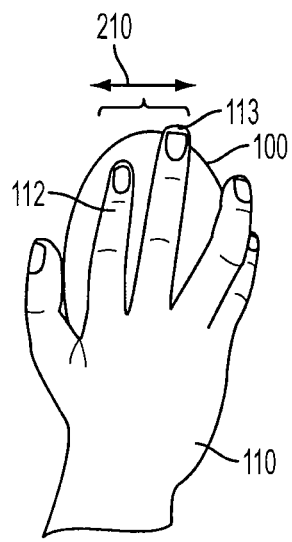

In the example of FIG. 2b, index finger 112 and middle finger 113 of right hand 110 together can make lateral motions 210 to make a gesture such as a swipe gesture while the hand rests on a surface of mouse 100. The other fingers of the hand 110 can remain substantially stationary on the mouse surface.

Figure 2C:
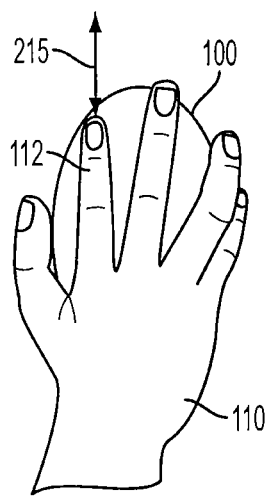

In the example of FIG. 2c, index finger 112 of right hand 110 can make longitudinal motions 215 to make a gesture such as a "scroll" gesture while the hand rests on a surface of mouse 100. A scroll gesture can cause a computing system to perform an operation such as scrolling up or down in a UI on a display screen. The other fingers of the hand 110 can remain substantially stationary on the mouse surface.

Figure 2D:
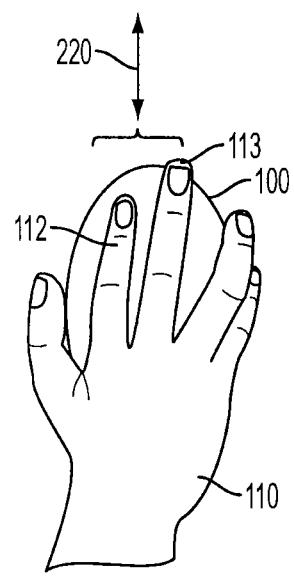

In the example of FIG. 2d, index finger 112 and middle finger 113 of right hand 110 together can make longitudinal motions 220 to make a gesture such as a scroll gesture while the hand rests on a surface of mouse 100. The other fingers of hand 110 can remain substantially stationary on the mouse surface.

Figure 2E:
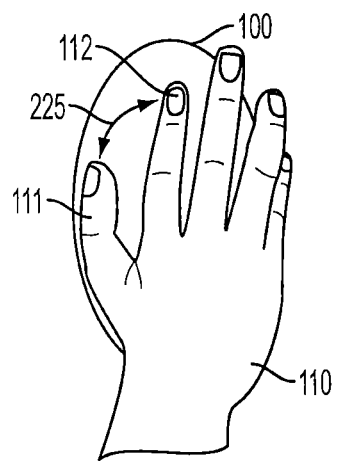

In the example of FIG. 2e, thumb 111 and index finger 112 of right hand 110 can move together to make pinching motions 225 to make a gesture such as a "zoom" gesture while the hand rests on a surface of mouse 100. A zoom gesture can cause a computing system to perform an operation such as enlarging or shrinking a UI element on a display screen. The other fingers of hand 110 can remain substantially stationary on the mouse surface.

Figure 2F:
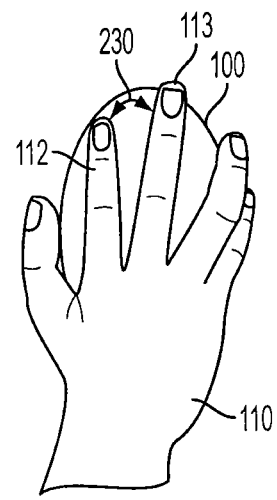

In the example of FIG. 2f, index finger 112 and middle finger 113 of right hand 110 can move together to make pinching motions 230 to make a gesture such as a zoom gesture while the hand rests on a surface of mouse 110. The other fingers of hand 110 can remain substantially stationary on the mouse surface.

Figure 2G:
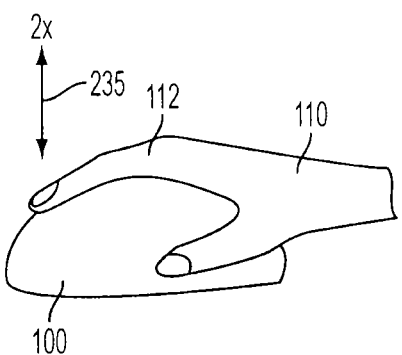

In the example of FIG. 2g, index finger 112 of right hand 110 can make tapping motion 235 twice to make a gesture such as a "double click" gesture while the hand rests on a surface of mouse 100. A double click gesture can cause a computing system to perform an operation such as selecting a UI element pointed to by an input pointer on a display screen. The other fingers of hand 110 can remain substantially stationary on the mouse surface.

Figure 2H:
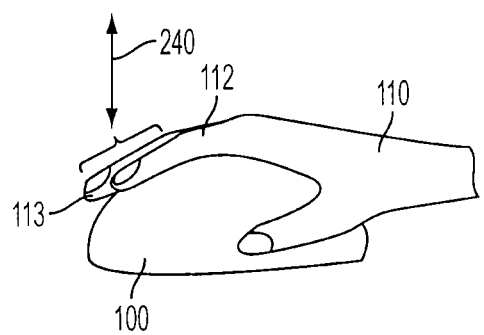

In the example of FIG. 2h, index finger 112 and middle finger 113 of right hand 110 together can make tapping motion 240 once to make a gesture such as a double click gesture while the hand rests on a surface of mouse 100. The other fingers of hand 110 can remain substantially stationary on the mouse surface.

Figure 2I:
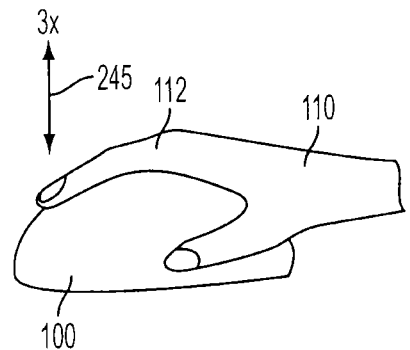

In the example of FIG. 2i, index finger 112 of right hand 110 can make tapping motion 245 three times to make a gesture such as a "triple click" gesture while the hand rests on a surface of mouse 100. A triple click gesture can cause a computing system to perform an operation such as selecting a plurality of UI elements pointed to by an input pointer on a display screen. The other fingers of the hand 110 can remain substantially stationary on the mouse surface.

Figure 2J:
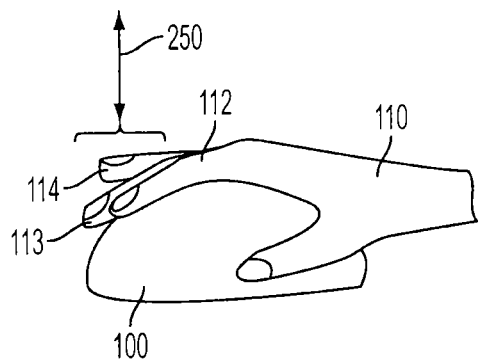

In the example of FIG. 2j, index finger 112, middle finger 113, and ring finger 114 of right hand 110 together can make tapping motion 250 once to make a gesture such as a triple click gesture while the hand rests on a surface of mouse 100. The other fingers of the hand 110 can remain substantially stationary on the mouse surface.

Figure 2K:
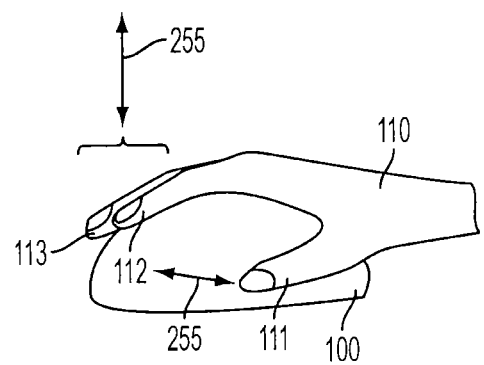

In the example of FIG. 2k, thumb 111, index finger 112, and middle finger 113 of right hand 110 together can make tapping motion 255 once to make a gesture such as a triple click gesture while the hand rests on a surface of mouse 100. The other fingers of the hand 110 can remain substantially stationary on the mouse surface.

Although some embodiments of the invention are described herein in terms of right-handed gestures, it is to be understood that the embodiments can include left-handed gestures as well. It is further to be understood that embodiments are not limited to the gestures described herein, but can include any suitable gestures that can be made on a mouse surface. Moreover, the gestures are not limited to being made by the fingers described herein, but can be made by additional or other fingers capable of making the gestures.

Figure 3A:
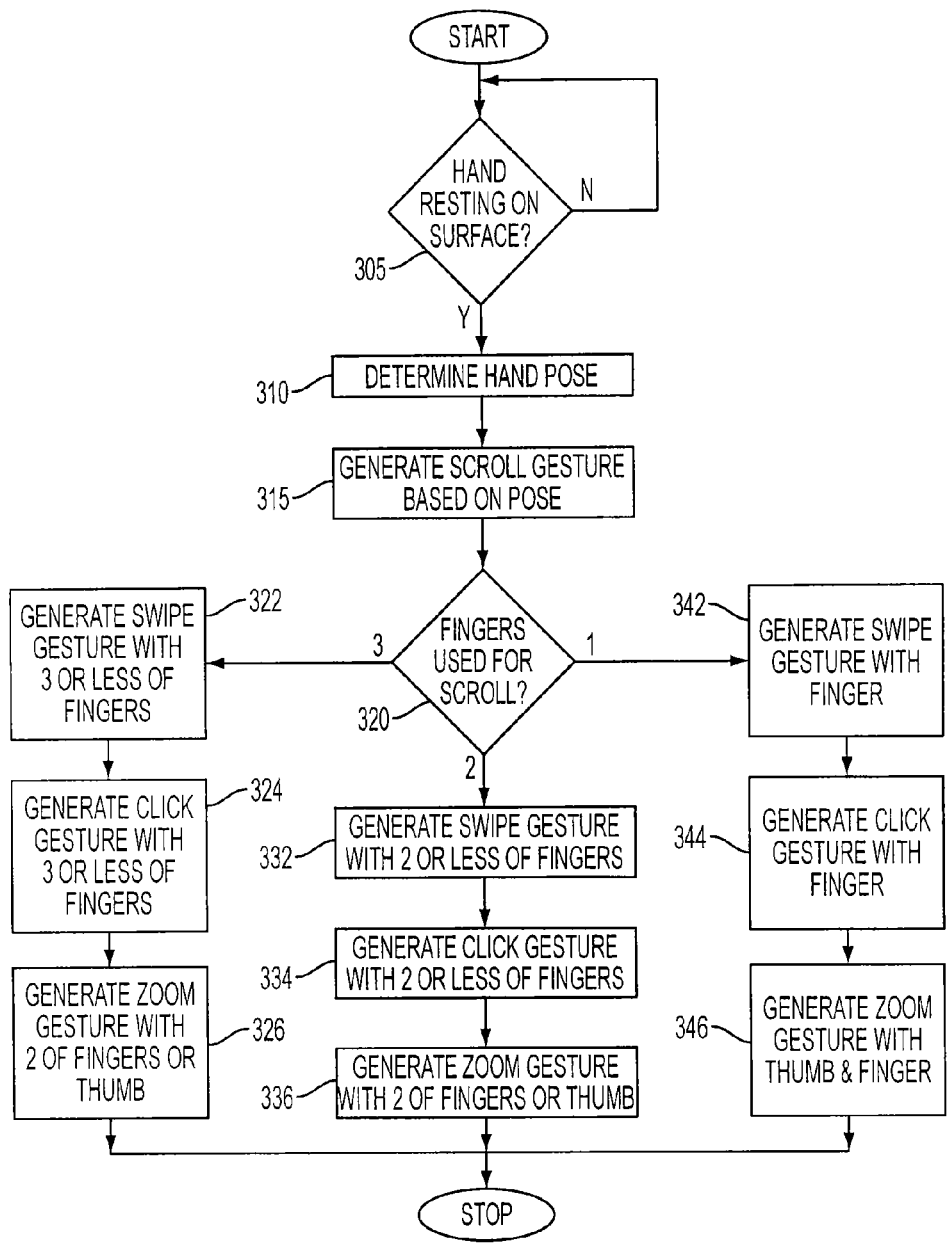
FIG. 3a illustrates an exemplary method for generating gestures tailored to a hand resting on a mouse according to embodiments of the invention.

FIG. 3a illustrates an exemplary method for generating a gesture tailored to a hand resting on a mouse according to embodiments of the invention. In the example of FIG. 3a, a determination can be made whether a hand is resting on a mouse (305). This can be done by detecting whether a touch event has occurred on the mouse surface. If a hand is resting on the mouse, a touch image corresponding to the fingers of the hand resting on the mouse surface can be captured.

The captured image can be processed to determine the hand pose (310). For example, which, how many, and where fingers are resting on the top and side surfaces of the mouse can be determined using standard signal processing techniques.

Based on the determined hand pose, a scroll gesture can be generated (315). For example, if the user's natural hand pose involves the index and middle fingers resting on the top surface of the mouse, then a scroll gesture can be generated that involves these two fingers, as in FIG. 2d, or either finger, as in FIG. 2c, performing longitudinal motions on the mouse surface to cause the computing system to execute a scroll operation. Alternatively, if the user's natural hand pose involves only the index finger resting on the top surface of the mouse, then a scroll gesture can be generated that involves that finger performing longitudinal motions on the mouse surface, as in FIG. 2c, to cause the computing system to execute a scroll operation. Alternatively, if the user's natural hand pose involves the index, middle, and ring fingers resting on the top surface of the mouse, then a scroll gesture can be generated that involves these three fingers or a subset thereof, as in FIGS. 2c and 2d, performing longitudinal motions on the mouse surface to cause the computing system to execute a scroll operation. Other natural poses are also available for generating a scroll gesture.

Based on the fingers involved in the scroll gesture, other gestures can be generated (320). Other gestures can be generated based on the generated scroll gesture that involves three fingers, such as the index, middle, and ring fingers. A swipe gesture can be generated that involves all three fingers or a subset thereof, as in FIGS. 2a and 2b, performing lateral motions on a mouse surface to cause the computing system to execute a swipe operation (322). A click gesture can be generated that involves all three fingers or a subset thereof, as in FIGS. 2g through 2k, performing one or more tapping motions on a mouse surface to cause the computing system to execute a click operation (324). A zoom gesture can be generated that involves two of the fingers, as in FIG. 2f, or one of the fingers and a thumb, as in FIG. 2e, performing pinching motions on a mouse surface to cause the computing system to execute a zoom operation (326).

Similarly, other gestures can be generated based on the generated scroll gesture that involves two fingers, such as the index and middle fingers. A swipe gesture can be generated that involves both fingers or either finger performing lateral motions on a mouse surface (332). A click gesture can be generated that involves both fingers or either finger performing one or more tapping motions on a mouse surface (334). A zoom gesture can be generated that involves both fingers or one of the fingers and a thumb performing pinching motions on a mouse surface (336).

Similarly, other gestures can be generated based on the generated scroll gesture that involves one finger, such as the index finger. A swipe gesture can be generated that involves that finger performing lateral motions on a mouse surface (342). A click gesture can be generated that involves that finger performing tapping motions on a mouse surface (344).

A zoom gesture can be generated that involves that finger and a thumb performing pinching motions on a mouse surface (346).

The generated gestures can be stored in memory of the computing system for later use in identifying gestures made on the mouse surface.

As an alternative to the method of FIG. 3a, rather than the gestures being generated automatically based on the natural pose of the user's hand, the gestures may be selected by the user. For example, a query may be made to the user about which fingers the user wishes to use to make a scroll gesture and the gesture can be generated based on the user's reply. Subsequently, the user can also indicate the user's preferences for other gestures as well, such as swipe, zoom, and click. Alternatively, based on the user's selection for the scroll gesture, the computing system can automatically generate other gestures.

As another alternative to the method of FIG. 3a, rather that the scroll gesture being the first gesture automatically generated based on the natural pose of the user's hand, the gestures can be prioritized and generated based on a priority. For example, in a computing system where a swipe gesture is either used more frequently or deemed more important, the swipe gesture can be generated first. In such an embodiment, the swipe gesture can be generated based on the natural pose of the user's hand. Other gestures can be generated based on the fingers involved in the swipe gesture. Alternatively, the user can select the order in which the gestures can be generated.

As another alternative to the method of FIG. 3a, rather than the subsequent gestures involving the same or a subset of the fingers involved in the scroll gesture, subsequent gestures can involve other fingers or a superset of the fingers involved in the scroll gesture.

It is to be understood that the methods for gesture generation are not limited to those described herein, but may include other or additional steps capable of performing gesture generation according to embodiments of the invention.

Figure 3B:
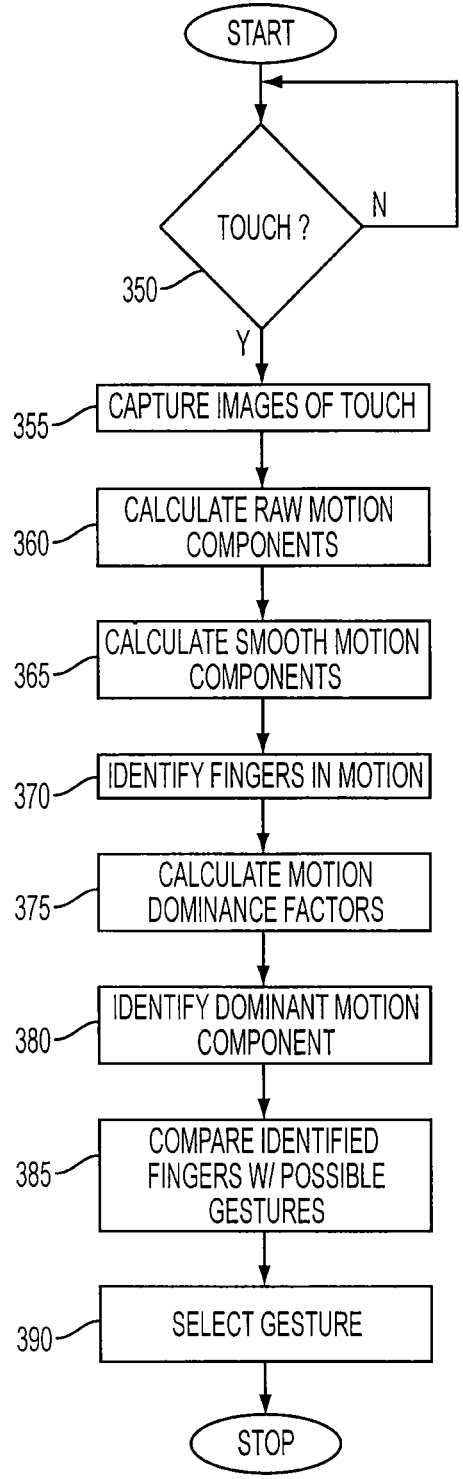
FIG. 3b illustrates an exemplary method for detecting gestures tailored to a hand resting on a mouse according to embodiments of the invention.

FIG. 3b illustrates an exemplary method for detecting a gesture tailored to a hand resting on a mouse according to embodiments of the invention. In the example of FIG. 3b, a determination can be made whether a touch event has occurred on a mouse surface (350). If a touch event has occurred, a plurality of touch images corresponding to the fingers of the hand resting on the mouse surface can be captured (355). The images can capture the movement of the fingers making a gesture as well as the substantial lack of movement of the other fingers.

Motion components of the fingers can be calculated (360). Motion components can include a translation component, comprising an x component and a y component, a scale (or zoom) component, and a rotate component. The translation component can represent the change in location of fingers across the mouse surface. The scale component can represent the change in distance between fingers across the mouse surface, i.e., the dot product of the finger motion vectors. The rotate component can represent the change in angle between fingers across the mouse surface, i.e., the cross product of the finger motion vectors. Calculation of motion components is disclosed in U.S. Pat. No. 6,323,846 entitled "Method and Apparatus for Integrating Manual Input," the contents of which are incorporated herein by reference in their entirety for all purposes.

As in U.S. Pat. No. 6,323,846, the translation motion component between fingers can be calculated as a simple average of the fingers' respective translation motion components. However, for mouse applications, it may be more ergonomic for one finger to move on the mouse surface, while the other fingers either remain stationary or move very little, such as during a scroll gesture. As such, because one finger may be moving much faster than the other finger or because one finger may be moving and the other finger not at all, a simple average may not be an accurate representation of the translation motion. In such a case, the translation motion component $V_t$ between fingers can be calculated as a weighted average of the fingers' respective translation motion components, in which the faster finger can be weighed more heavily than the slower or non-moving finger, as follows.

$$V_t = \frac{w_1 V_{t1} + w_2 V_{t2}}{w_1 + w_2}, \quad (1)$$

where $w_1$ and $w_2$ are the weights and $V_{t1}$ and $V_{t2}$ are the translation motion components for finger 1 and finger 2, respectively. Equation (1) can be applied when moving non-thumb fingers because generally the thumb may make a scale or rotate motion rather than a translation motion.

Smooth motion components of the fingers can be calculated from the raw motion components (365). This can be done by applying a low-pass filter (LPF) to the raw motion components to produce faster buildup of the smooth motion components as the finger motion starts and slower decay of the smooth motion components as the finger motion stops. By building up the smooth motion components faster, the smooth motion components can be available more quickly for gesture detection. By decaying the smooth motion components more slowly, the smooth motion components can continue to be available for gesture detection for some time after the finger motion stops should there be a need for additional finger motion information. An exemplary low-pass filter is a simple first-order autoregressive filter. Calculation of the smooth motion components is disclosed in U.S. patent application Ser. No. 12/238,342 entitled "Motion Component Dominance Factors for Motion Locking of Touch Sensor Data," the contents of which are incorporated herein by reference in their entirety for all purposes.

In some embodiments, the smooth finger speed can be used as the weights in the weighted translation motion component calculation. As such, the weighted translation motion component $V_t$ between fingers, as in Equation (1), can be written as follows.

$$V_t = \frac{s_{t1} V_{t1} + s_{t2} V_{t2}}{s_{t1} + s_{t2}}, \quad (2)$$

where $s_{t1}$ and $s_{t2}$ are the smooth finger speeds and $V_{t1}$ and $V_{t2}$ are the translation motion components for finger 1 and finger 2, respectively. Accordingly, the weighted translation motion component can be calculated between two fingers by calculating the average of their respective translation motion components weighted by their corresponding smooth finger speeds.

The fingers in motion can be identified (370). The fingers can be identified based on their relative locations in a touch image. For example, in a touch image of a right hand, the thumb may be identified as the leftmost touch in a lower portion of the touch image, the index finger may be identified as the adjacent touch in an upper portion of the touch image, the middle finger may be identified as the next adjacent touch having the uppermost location in the touch image, the ring finger may be identified as the touch adjacent to the rightmost touch in an upper portion of the touch image, and the pinkie may be identified as the rightmost touch in a lower portion of the touch image. Alternatively, each finger can be assigned a specific region of the touch image where the finger's touch most likely appears, such that any touch in that region of the touch image can be identified as that assigned finger, regardless of the relative locations in the touch image of other fingers' touches. Other criteria for identifying the fingers in motion can be used as well. The fingers' motion can be calculated as described above regarding translation, scale, and rotate motion components.

Motion dominance factors may be calculated as weights for the three motion components based on the type of gesture (375). For example, a particular gesture can have a significant translation motion of the fingers in the longitudinal direction on a mouse surface. However, because the fingers do not move in absolute straight lines, there may also appear to be some slight scale motion, i.e., the fingers moving closer together or farther apart during the gesture, or rotate motion, i.e., one or more of the fingers moving at an angle during the gesture. Since the translation motion dominates in the particular gesture, weights (i.e., motion dominance factors) may be assigned to the three motion components to favor the significant translation motion and ignore the slight scale and rotate motions. Calculation of the motion dominance factors is disclosed in U.S. patent application Ser. No. 12/238,342, referenced above.

As in U.S. patent application Ser. No. 12/238,342, the motion dominance factors, when the thumb is one of the moving fingers involved in the gesture, can be higher for scale and rotate motions than for translation motion. This can reflect the dominance of the scale and rotate motion components over the translation motion components for the thumb in the gesture. In some embodiments, the scale and rotate dominance factors can be set to about 2.5, while the translation dominance factor can be set to about 0.25. For mouse applications, when only non-thumb fingers are involved in the gesture, it can be expected ergonomically that the likely motion is a translation motion. As such, the motion dominance factor for translation motion can be set, while the motion dominance factors for scale and rotate motions can be turned off or set very low. This can reflect the dominance of the translation motion component over the scale and rotate motion components for the non-thumb fingers in the gesture. In some embodiments, the translation dominance factor can be set to 1.0, while the scale and rotate dominance factors can be turned off or set to 0.10.

The dominant motion component(s) from among the translation, scale, and rotate motion components can be identified based on the motion dominance factors (380). Identification of the dominant motion component(s) is also disclosed in U.S. patent application Ser. No. 12/238,342, referenced above.

The identified fingers and their dominant motion component(s) can be compared to a plurality of possible gestures to determine which gesture they most closely match (385). For example, a plurality of possible gestures tailored to a user's hand that can be made on a mouse surface can be stored in memory. Each stored gesture can identify the fingers that can perform the gesture and the dominant motion component(s). The comparison can be done by comparing the stored gesture's fingers to be used with the fingers identified in the touch event and by comparing the stored gesture's dominant motion component(s) with the dominant motion component(s) of the fingers identified in the touch event. Other features of the possible gestures can be stored and compared as well.

The stored gesture most closely matching the identified fingers and the identified dominant motion component(s) can be selected as the detected gesture (390). The detected gesture can be processed by a computing system to execute a corresponding operation.

It is to be understood that the methods for gesture detection are not limited to those described herein, but may include other or additional steps capable of performing gesture detection according to embodiments of the invention.

Figure 4:
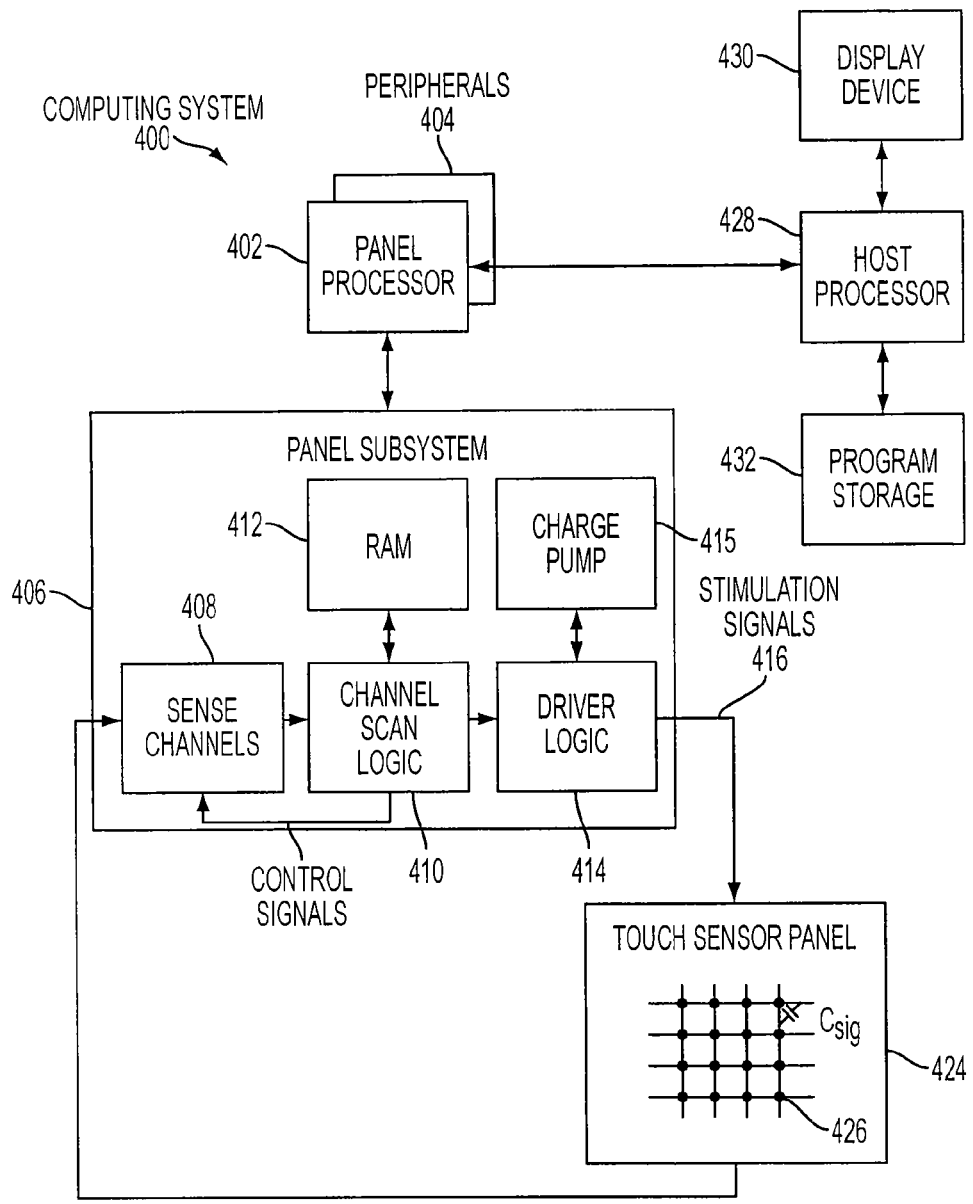
FIG. 4 illustrates an exemplary computing system implementing gesture generation and detection algorithms according to embodiments of the invention.

FIG. 4 illustrates an exemplary computing system implementing gesture generation and detection algorithms according to embodiments of the invention. In the example of FIG. 4, computing system 400 can include one or more panel processors 402, which can execute software or firmware implementing the algorithms according to embodiments of the invention, and peripherals 404, and panel subsystem 406. Peripherals 404 can include, but are not limited to, random access memory (RAM) or other types of memory or storage, watchdog timers and the like. Panel subsystem 406 can include, but is not limited to, one or more sense channels 408, channel scan logic (analog or digital) 410 and driver logic (analog or digital) 414. Channel scan logic 410 can access RAM 412, autonomously read data from sense channels 408 and provide control for the sense channels. In addition, channel scan logic 410 can control driver logic 414 to generate stimulation signals 416 at various phases that can be simultaneously applied to drive lines of touch sensor panel 424. Panel subsystem 406 can operate at a low digital logic voltage level (e.g. 1.7 to 3.3V). Driver logic 414 can generate a supply voltage greater that the digital logic level supply voltages by cascading two charge storage devices, e.g., capacitors, together to form charge pump 415. Charge pump 415 can be used to generate stimulation signals 416 that can have amplitudes of about twice the digital logic level supply voltages (e.g. 3.4 to 6.6V). Although FIG. 4 shows charge pump 415 separate from driver logic 414, the charge pump can be part of the driver logic. In some embodiments, panel subsystem 406, panel processor 402 and peripherals 404 can be integrated into a single application specific integrated circuit (ASIC).

Touch sensor panel 424 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 426, which can be particularly useful when touch sensor panel 424 is viewed as capturing an "image" of touch. (In other words, after panel subsystem 406 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between the drive and sense lines and local system ground appears as a stray capacitance Cstray and the capacitance at the intersections of the drive and sense lines, i.e., the pixels, as a mutual signal capacitance Csig when the given drive line is stimulated with an alternating current (AC) signal. The presence of a finger or other object near or on the touch sensor panel can be detected by measuring changes to a signal charge present at the pixels being touched, which is a function of Csig. Each sense line of touch sensor panel 424 can drive sense channel 408 in panel subsystem 406.

Touch sensor panel 424 can cover a portion or substantially all of a surface of an input device, such as a mouse.

Computing system 400 can also include host processor 428 for receiving outputs from panel processor 402 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 428 can execute software or firmware implementing the algorithms according to embodiments of the invention. Host processor 428 can also perform additional functions that may not be related to panel processing, and can be coupled to program storage 432 and display device 430 such as an LCD display for providing a UI to a user of the device. Display device 430 together with touch sensor panel 424, when located partially or entirely under the touch sensor panel, can form a touch screen.

Note that one or more of the functions described above can be performed by firmware stored in memory (e.g. one of the peripherals 404 in FIG. 4) and executed by panel processor 402, or stored in program storage 432 and executed by host processor 428. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 4, but may be a proximity sensor panel or any other sensor panel capable of sensing a touch or hover event and generating or detecting a gesture according to embodiments of the invention. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel.

Figure 5:
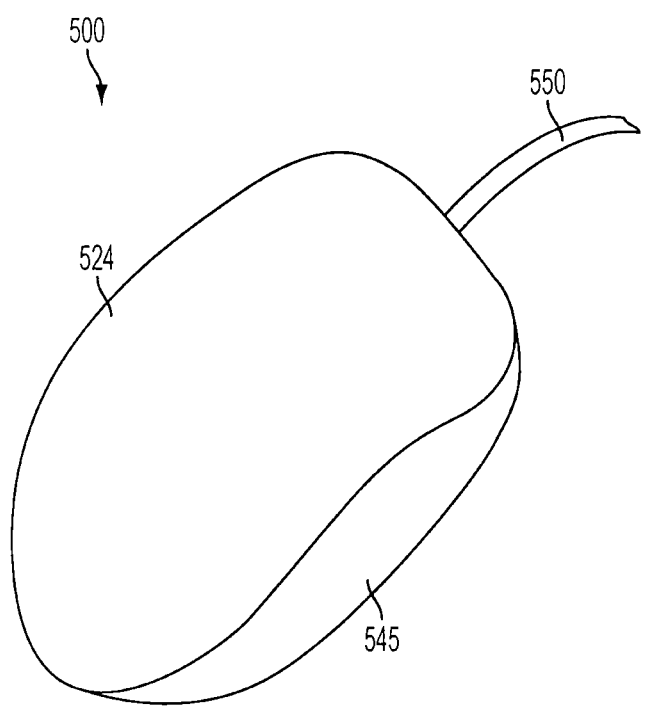
FIG. 5 illustrates an exemplary mouse that can include a touch sensor panel which can communicate touch information to the computing system of FIG. 4 to be used to execute gesture generation and detection algorithms according to embodiments of the invention.

FIG. 5 illustrates an exemplary touch sensitive mouse 500 that can include a touch sensor panel 524 on a mouse surface, a base 545, and other computing system blocks in the computing system of FIG. 4 that can be utilized to execute gesture generation and detection algorithms according to embodiments of the invention. In some embodiments, the mouse 500 can communicate with the computing system via cable 550. In some embodiments, the mouse 500 can communicate with the computing system via a wireless connection.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for selecting gestures tailored for a hand resting on a touch surface, comprising:
   storing a plurality of gestures for executing a first operation;
   identifying one or more fingers of the hand resting on the touch surface;
   based on at least a first subset of the identified fingers, selecting a first gesture from among the stored plurality of gestures;
   receiving data indicative of at least the first subset of identified fingers performing a gesture;
   comparing the stored first gesture to the performed gesture; and
   executing the first operation based on the comparison.

2. The method of claim 1, wherein the identifying of the fingers comprises identifying the fingers of the hand posed to make longitudinal motions on the touch surface as part of the first gesture and the first operation is a scroll operation.

3. The method of claim 1, wherein the selecting of the first gesture comprises selecting one or more of the identified fingers posed to make lateral motions on the touch surface as part of the first gesture and the first operation is a swipe operation.

4. The method of claim 1, further comprising:
   selecting a second gesture based on at least a second subset of the identified fingers.

5. The method of claim 4, wherein the selecting of the second gesture comprises selecting one or more of the identified fingers posed to make tapping motions on the touch surface as part of the second gesture.

6. The method of claim 4, wherein the selecting of the second gesture comprises selecting one or more of the identified fingers posed to make pinching motions on the touch surface as part of the second gesture.

7. The method of claim 1, further comprising selecting one or more unidentified fingers, wherein the first gesture is selected based on the first subset and the one or more unidentified fingers.

8. A method for selecting gestures tailored to a hand resting on a touch surface, comprising:
storing a plurality of gestures for executing a first operation;
determining a pose of the hand resting on the touch surface;
based on the hand pose, selecting, from among the stored plurality of gestures, a first gesture to be performed by the hand involving one or more fingers of the hand resting on the touch surface;
selecting a second gesture to be performed by the hand involving at least a subset of the fingers;
receiving data indicative of the hand performing a gesture;
comparing the stored first gesture to the performed gesture; and
executing the first operation based on the comparison.

9. The method of claim 8, further comprising:
receiving an input selecting the fingers involved in the first gesture.

10. The method of claim 8, wherein the selecting of the first gesture comprises selecting the first gesture utilizing the fingers that can make longitudinal motions on the touch surface and the first operation is a scroll operation.

11. The method of claim 8, wherein the selecting of the second gesture comprises selecting the second gesture utilizing one or more of the fingers that can make lateral motions on the touch surface.

12. The method of claim 8, further comprising:
receiving an input selecting the subset of the fingers involved in the second gesture.

13. The method of claim 8, wherein the first gesture has a first priority to be defined and the second gesture has a second priority to be defined.

14. A method for selecting a gesture tailored to a hand resting on a touch surface, comprising:
storing a plurality of gestures for executing a first operation;
determining a pose of the hand resting on the touch surface;
responsive to a touch event made by the hand resting on the touch surface, identifying which fingers of the hand are moving and which fingers of the hand remain substantially stationary;
determining motion components of the identified moving fingers;
selecting, from among the stored plurality of gestures, a first gesture tailored to the pose of the hand that can be made by the identified moving fingers having at least one of the determined motion components;
receiving data indicative of the hand performing a gesture;
comparing the stored first gesture to the performed gesture; and
executing the first operation based on the comparison.

15. The method of claim 14, wherein the motion components comprise at least one of a translation motion component, a scale motion component, and a rotate motion component.

16. The method of claim 15, wherein the translation motion component is calculated as a weighted average of translation motion components of the identified moving fingers, the faster of the identified moving fingers being weighted more heavily than the rest of the identified moving fingers.

17. The method of claim 14, further comprising:
determining a dominant motion component from among the determined motion components; and
selecting the first gesture having the determined dominant motion component.

18. The method of claim 17, wherein the determining of the dominant motion component comprises:
calculating motion dominance factors corresponding to the determined motion components,
wherein the motion dominance factors for a scale motion component and a rotate motion component are high when a thumb is one of the identified moving fingers, and
wherein the motion dominance factor for a translation motion component is high when the thumb is not one of the identified moving fingers.

19. A non-transitory computer readable storage medium comprising program code for selecting gestures tailored to a hand resting on a touch surface, the program code for causing performance of a method comprising:
storing a plurality of gestures for executing a first operation;
responsive to a touch event on a touch surface, determining a pose of a hand resting on the touch surface, the pose comprising the touch event;
based on the hand pose, selecting, from among the stored plurality of gestures, a first gesture to be performed by the hand;
defining a second gesture to be performed by the hand;
receiving data indicative of the hand performing a gesture;
comparing the stored first gesture to the performed gesture; and
executing the first operation based on the comparison.

20. The non-transitory computer readable storage medium of claim 19, wherein the touch event comprises a natural pose of the hand resting on the touch surface.

21. The non-transitory computer readable storage medium of claim 19, wherein the determining of the pose comprises determining which fingers comprise the touch event, how many fingers comprise the touch event, or where fingers touch on the touch surface during the touch event.

22. The non-transitory computer readable storage medium of claim 19, wherein the selecting of the first gesture comprises selecting fingers of the hand posed to make the first gesture.

23. The non-transitory computer readable storage medium of claim 19, wherein the selecting of the second gesture comprises selecting fingers of the hand from the first gesture posed to make the second gesture.

24. A computing system comprising the non-transitory computer readable storage medium of claim 19.

25. A computing system, comprising:
a storage capable of storing a plurality of gestures for executing a first operation;
a processor capable of receiving data from an input device, the input device having a plurality of input sensors configured to detect a plurality of inputs on a surface of the input device, and the plurality of inputs corresponding to objects resting on the surface;
wherein the processor is further capable of:
selecting, based on the plurality of inputs and from among the stored plurality of gestures, a first gesture to be performed by the objects;
receiving data indicative of the objects performing a gesture;
comparing the stored first gesture to the performed gesture; and
executing the first operation based on the comparison.

26. The system of claim 25, wherein the objects comprise fingers of a hand resting in a natural pose on the surface.

27. The system of claim 25, wherein the plurality of input sensors is a plurality of touch sensors configured to detect a touch comprising a natural pose of a hand resting on the surface of the input device.

28. The system of claim 27, wherein the plurality of touch sensors is incorporated into a touch sensor panel disposed on the surface of the input device.

29. The system of claim 25, wherein the input device is a mouse.

30. The system of claim 29, wherein the plurality of input sensors is a plurality of touch sensors configured to detect a touch comprising a natural pose of a hand resting on the surface of the mouse and incorporated into a touch sensor panel disposed on the surface of the mouse.

* * * * *